(12) United States Patent
Saito et al.

(10) Patent No.: US 6,511,331 B2
(45) Date of Patent: Jan. 28, 2003

(54) ELECTRICAL JUNCTION BOX FOR A VEHICLE

(75) Inventors: Yukitaka Saito, Yokkaichi (JP); Naofumi Yamatake, Yokkaichi (JP); Nobuchika Kobayashi, Yokkaichi (JP); Koji Kasai, Kokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/994,815

(22) Filed: Nov. 28, 2001

(65) Prior Publication Data

US 2002/0064976 A1 May 30, 2002

Related U.S. Application Data

(63) Continuation-in-part of application No. 09/993,559, filed on Nov. 27, 2001.

(30) Foreign Application Priority Data

Nov. 28, 2000 (JP) .......................................... 2000-361263
Dec. 12, 2000 (JP) .......................................... 2000-376878

(51) Int. Cl.$^7$ ............................................. H01R 12/00
(52) U.S. Cl. ..................... 439/76.2; 439/74; 439/979; 439/65
(58) Field of Search .............................. 439/76.2, 949, 439/65, 74

(56) References Cited

U.S. PATENT DOCUMENTS

| | | | | |
|---|---|---|---|---|
| 4,850,884 A | * | 7/1989 | Sawai et al. | 439/76.2 |
| 5,229,922 A | * | 7/1993 | Muramatsu et al. | 439/76.2 |
| 5,703,757 A | * | 12/1997 | Hayes et al. | 439/76.2 |
| 2001/0049211 A1 | | 12/2001 | Sumida et al. | |

* cited by examiner

Primary Examiner—P. Austin Bradley
Assistant Examiner—Briggitte R. Hammond
(74) Attorney, Agent, or Firm—Oliff & Berridge, PLC (57) ABSTRACT

An electrical junction box for a vehicle has a connector module for connection in use to electrical connectors, a fuse module carrying fuses, and a relay module connected to relays. The connector module includes circuit plates stacked one on another to form a layered assembly which is mounted vertically. The fuse module has a circuit plate and is mounted at a lower opening of a casing so that it is accessible for insertion and removal of fuses. The circuit plate of the fuse module is perpendicular to the main faces of the layered assembly. A compact construction permitting easy access to the fuses is obtained.

11 Claims, 10 Drawing Sheets

ELECTRICAL JUNCTION BOX FOR A VEHICLE

This is a Continuation-in-Part of Application No. 09/993,559, filed Nov. 27, 2001.

BACKGROUND OF THE INVENTION

1. Field of Invention

The present invention relates to an electrical junction box for a vehicle, in particular a box to be connected to a wire harness for a vehicle. The invention also provides a vehicle such as an automobile having the electrical junction box mounted on it.

2. Description of Related Art

Recently, the rapid increase in the number of electric and electronic component parts that are mounted on a vehicle has led to increase in the number of circuits to be accommodated in a junction box in the vehicle. When forming branch circuits at high density, it is necessary to mount a large number of component parts on the junction box, which increases the number of assembly stages.

Figure 10:
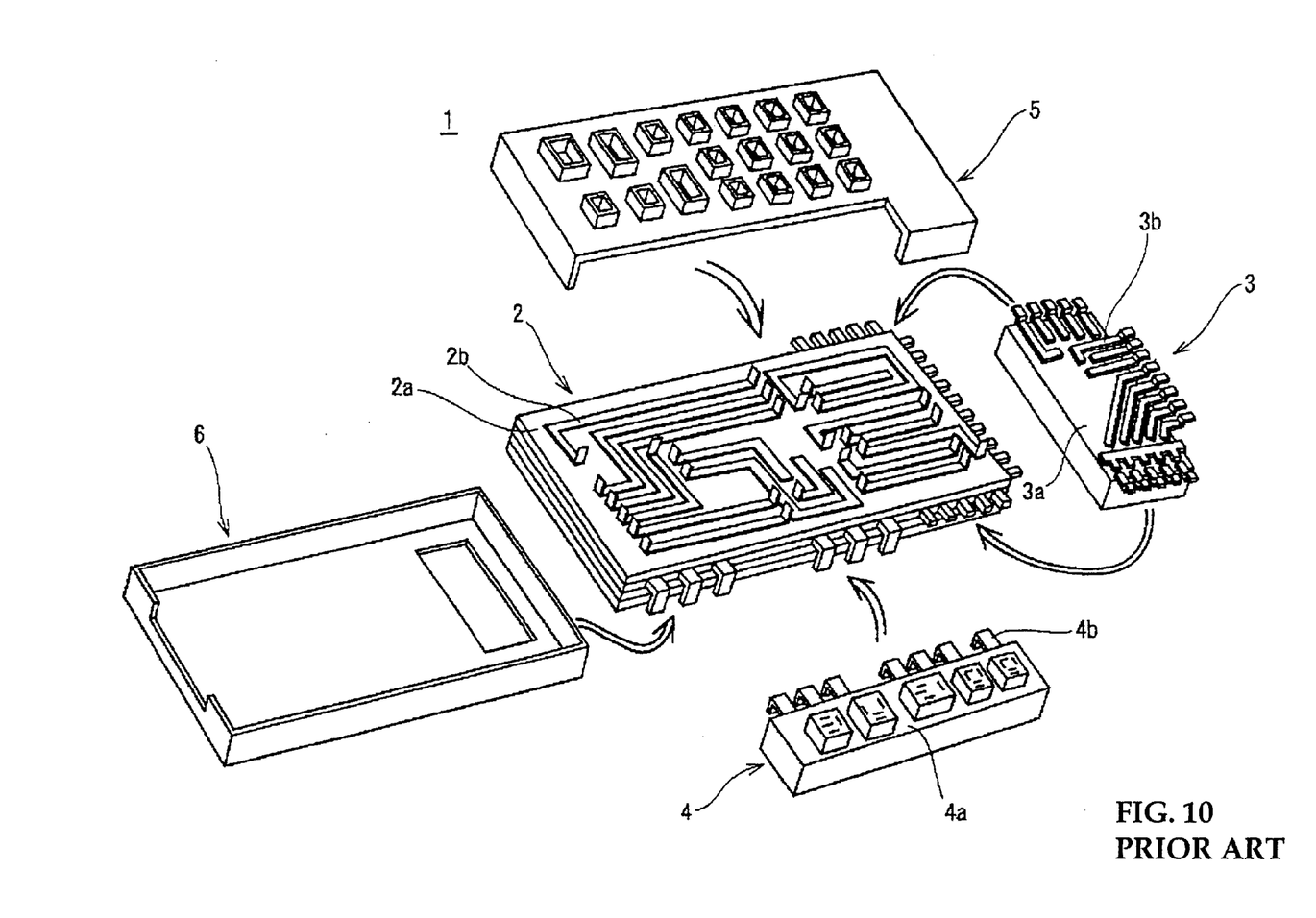
FIG. 10 is an exploded perspective view of a known junction box, described above.

The assignees of the present applicants proposed a junction box 1 shown in FIG. 10 in U.S. patent application Ser. No. 09/833,595. The junction box 1 of FIG. 10 is intended to be thin, capable of permitting circuit alteration and reducing time and labor when it is assembled from component parts.

In the junction box 1 of FIG. 10, a connector connection circuit (base circuit), a fuse connection circuit, and a relay connection circuit provided in the junction box 1 are formed separately as a connector module 2, a fuse module 3 and a relay module 4, respectively. The connector module 2, the fuse module 3 and the relay module 4 are incorporated in the casing composed of a lower case part 5 and an upper case part 6.

In each of the connector module 2, the fuse module 3 and the relay module 4, bus bars 2a, 3a and 4a are fixed to insulation substrates 2b, 2b and 4b, respectively, and project from the periphery of the insulation substrates where they are welded to each other.

Because the whole circuit of the junction box 1 is divided into the connector module 2, the fuse module 3 and the relay module 4, it can be avoided that tabs of the bus bars overlap on each other. Thus excessive layering of the bus bars can be prevented, and the junction box 1 can be thin. Further, the circuits of the bus bars can be wired easily. Thus it is possible to reduce the area of the bus bars of each module. Consequently, even though the connector connection bus bars 2a, the fuse connection bus bars 3a and the relay connection bus bars 4a are separately formed, it is possible to reduce the total area of the bus bars and avoid increase of the area of the junction box.

Further, when the specification of any one of the connector circuit 2, the fuse circuit 3 and the relay circuit 4 is altered, it is only necessary to alter the respective module. Thus, the junction box 1 permits alteration of the specification easily. This advantage is achieved because the entire circuit of the junction box having the connector connection circuit, the fuse connection circuit, and the relay connection circuit is divided into the connector module, the fuse module, and the relay module, respectively.

However, it is necessary to arrange the fuses of the fuse module so that they are accessible for easy replacement. Because, in this junction box 1, the fuse module 3 is placed on the connector module 2, the connector module 2 is required to be large and there are restrictions on the way in which the junction box 1 is mounted on a vehicle.

Figure 9A:
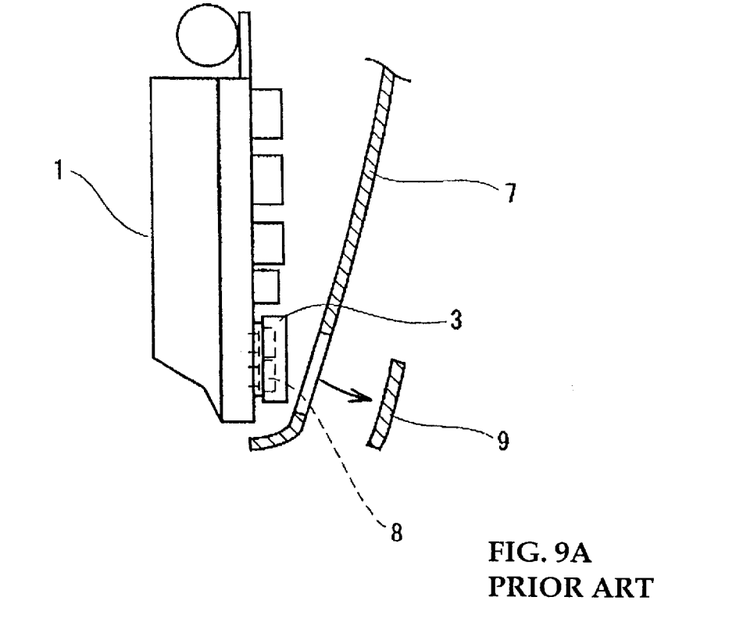
FIG. 9A is a schematic view showing a known junction box installed on a vehicle as described above.

As shown in FIG. 9A, if the junction box 1 is disposed vertically behind an instrument panel 7 of a vehicle, a fuse 8 is replaced horizontally by providing the instrument panel 7 with a fuse-replacement cover 9 which is removable from the instrument panel 7. Because of the mounting of the cover 9 on the instrument panel 7, there are restrictions on the design of the instrument panel 7, and further, the instrument panel 7 may have reduced collision strength.

SUMMARY OF THE INVENTION

Accordingly, it is an object of the present invention to provide an electrical junction box suitable for a vehicle which is compact and allows fuses to be replaced easily when the junction box is disposed behind an instrument panel.

According to the present invention, there is provided an electrical junction box having a casing having an opening, a connector module providing a connector connection circuit which in use makes electrical connection to at least one electrical connector, a fuse module providing a fuse connection circuit which in use makes electrical connection to a plurality of fuses, and a relay module providing a relay connection circuit which in use makes electrical connection to at least one relay. The connector module is mounted in the casing and comprises a plurality of circuit plates stacked one on another to form a layered assembly having a pair of main faces and a plurality of sides. The fuse module includes at least one circuit plate and a plurality of fuse-receiving locations and is mounted at the opening of the casing so that the fuse-receiving locations are accessible for insertion and removal of fuses, and so that the circuit plate thereof is perpendicular to the main faces of the layered assembly of the connector module.

The width of the fuse-receiving region of the fuse module is preferably larger than the height of this region, when there are many fuses. Thus, it is possible to remove the mounting region of the fuse module from the surface of the connector module by disposing the fuse module perpendicularly to the faces of the connector module. Therefore, it is possible to reduce the length of the faces of the connector module. Accordingly, it is possible to make the junction box compact in its longitudinal direction.

The invention also provides a vehicle having the electrical connection box mounted in it. The circuit plates of the connector module are disposed vertically, and at least one location for a connector is formed on a vertical side face of the casing. The fuse module is then disposed horizontally at a lower end of the casing, and in use a plurality of fuses on the fuse module are arranged horizontally side by side adjacent a lower end surface of the casing. Thereby, with the junction box is vertically disposed, it is possible to insert fuses into the fuse module and remove them therefrom from below, even though both sides of the junction box are closed. Thus the fuse insertion and fuse removal operation is convenient.

Preferably, the circuit plate of the fuse module extends alongside and parallel to a first edge of the layered assembly of the connector module, the fuse-receiving locations of the first module are arranged in at least one straight row extending parallel to the first edge of the layered assembly and parallel to the circuit plate of the fuse module, and the direction of insertion and removal of fuses at the fuse-receiving locations is perpendicular to the circuit plate of the fuse module and perpendicular to the first edge of the layered assembly.

Preferably, the circuit plate of the fuse module includes metal bus bars which are bent out perpendicularly from its surface to provide terminals at the fuse-receiving locations to be engaged by the fuses in use.

Preferably, the relay module includes a circuit plate which is mounted in the casing parallel to the main faces of the layered assembly of the connector module and adjacent to the fuse module. The relay module is thus disposed in the casing vertical side surface proximate to the fuse module. Because the relay module is disposed proximate to the fuse module, the connection between the relay module and the fuse module is confined to a small region. Thus, it is possible to improve the work of connection.

Preferably, an electronic control unit is accommodated in the casing in such a way that it is disposed between the connector module and one side face of the casing.

Preferably, in a vehicle, the electrical junction box has a mounting bracket projecting upwardly from its casing, and the vehicle has, adjacent the electrical junction box, a body member such as a panel, an instrument panel, and a floor, the mounting bracket being fixed to the body member and the fuse-receiving locations of the fuse module facing towards the floor whereby in use the fuses are inserted and removed in a space between a lower end of the instrument panel and the floor.

With this construction, the operation of replacing the fuses on the fuse module can be accomplished perpendicularly to the floor of the vehicle, with the junction box mounted on the body panel behind the instrument panel. Thus, it is unnecessary to provide the instrument panel with an openable cover for fuse replacement for horizontal insertion and removal of the fuses. Therefore, it is possible to reduce restrictions on the design of the instrument panel and avoid reducing the strength of the instrument panel because the instrument panel does not need to be provided with the openable cover.

BRIEF DESCRIPTION OF THE DRAWINGS

An embodiment of the invention will now be described by way of non-limitative example with reference to the drawings, in which.

DETAILED DESCRIPTION OF PREFERRED EMBODIMENTS

Figure 1:
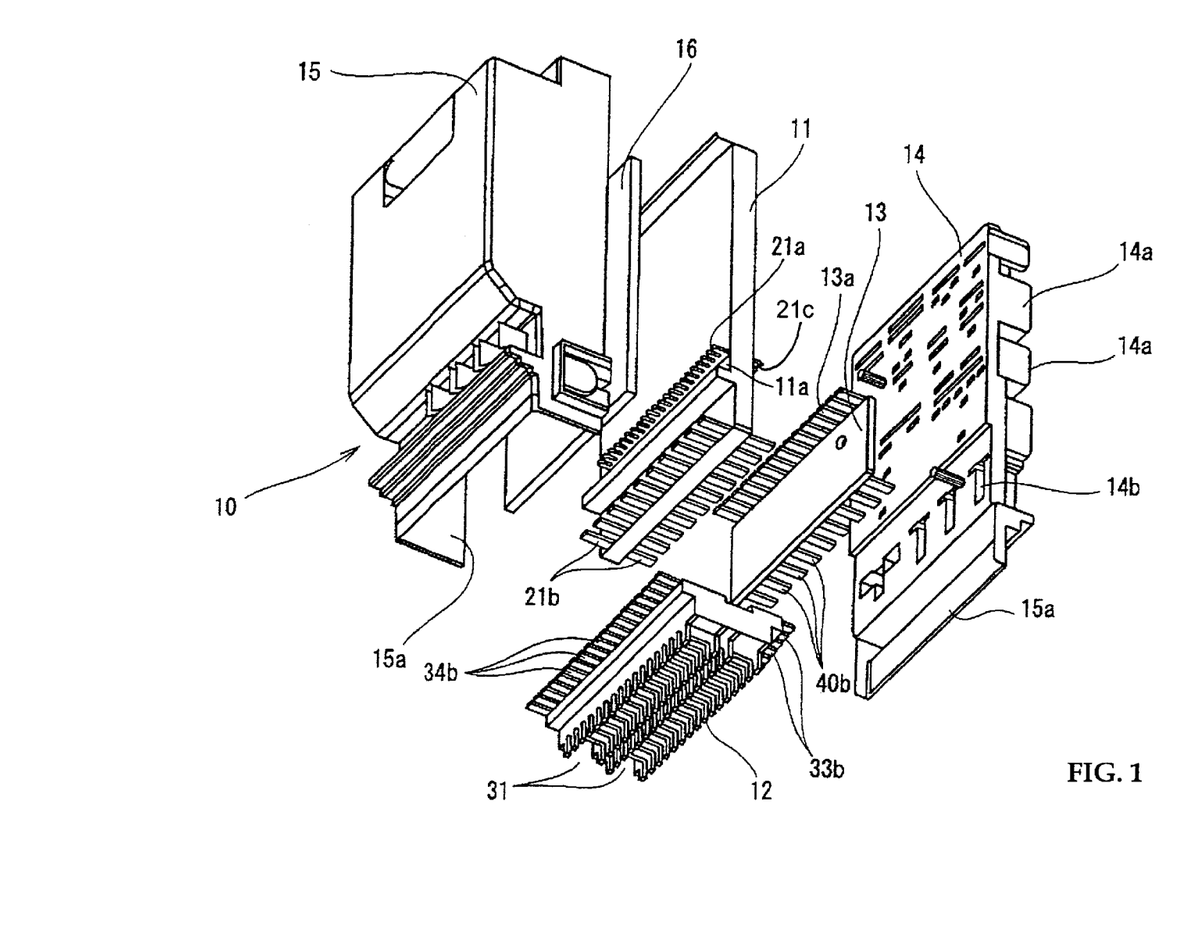
FIG. 1 is a schematic exploded perspective view of a junction box which is an exemplary embodiment of the present invention.
Figure 2:
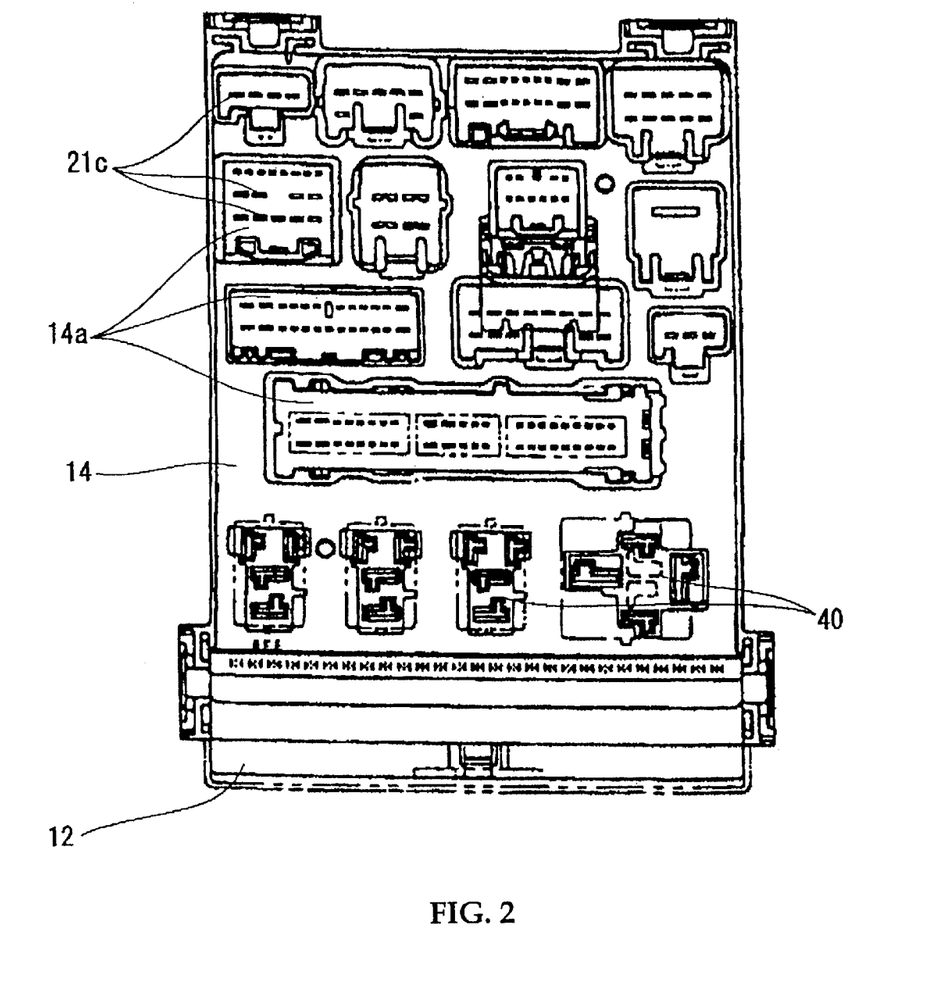
FIG. 2 is a side view of one case of the junction box of FIG. 1.
Figure 3:
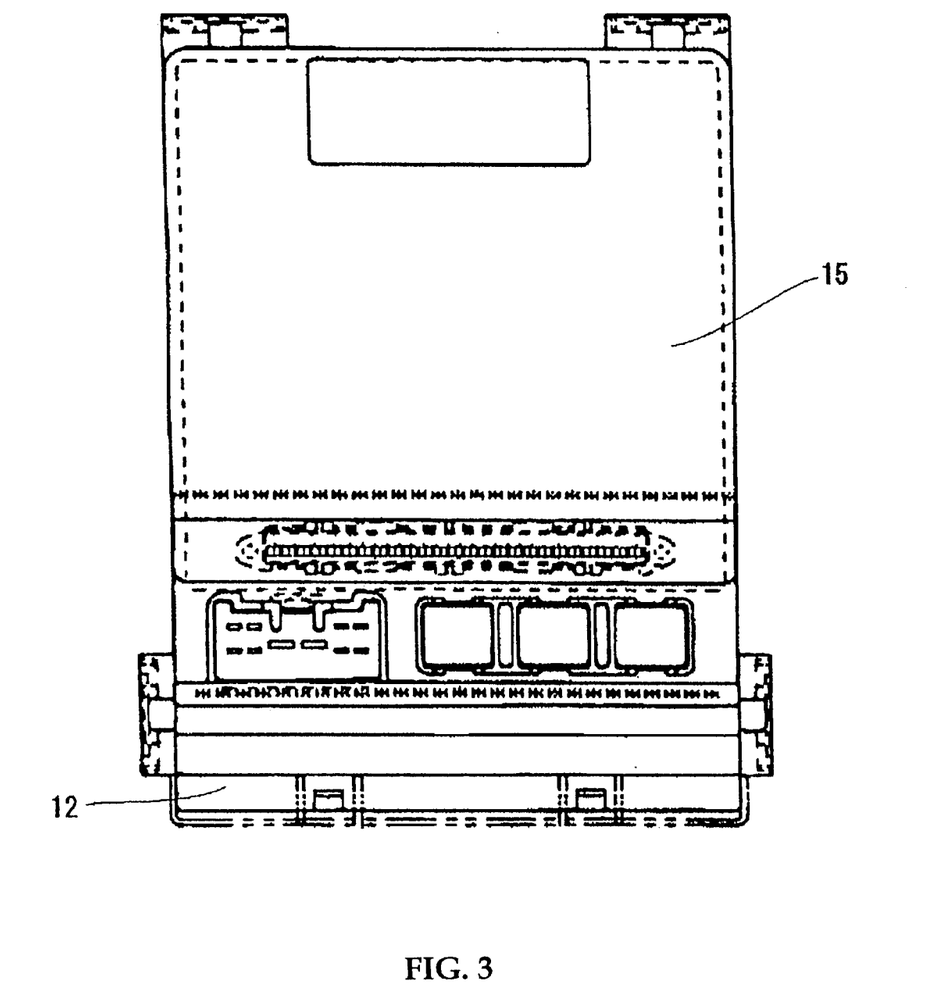
FIG. 3 is a side view of the outer side of another case of the junction box of FIG. 1.

FIG. 1 is a schematic exploded perspective view showing component parts constituting a junction box 10 which is intended to be connected to at least one wire harness in a vehicle such as an automobile. The box 10 has a connector module 11, a fuse module 12, a relay module 13, a first case 14, a second case 15 and an electronic control unit 16. Between the first and second cases 14, 15, which constitute a casing having opposite parallel vertical side walls, the relay module 13, the connector module 11 and the electronic control unit 16 are arranged vertically and sequentially one alongside another. An opening 15a for receiving the fuse module 12 is formed by peripheral walls of the cases 14, 15 and located between the cases 14, 15. The fuse module 12 extends along the opening 15a horizontally, with its bus bar-carrying substrate (described below) perpendicular to the main faces of the connector module 11. Fuses 30 (see FIG. 4) are mounted on the fuse module 12 from below. Relays 40 mounted on a side surface of the relay module 13 are exposed to the outside through openings 14b formed in the second case 14. A plurality of connector sockets 14a for receiving connectors to be connected to the connector module 11 are also formed on the side surface of the second case 14.

Figure 4:
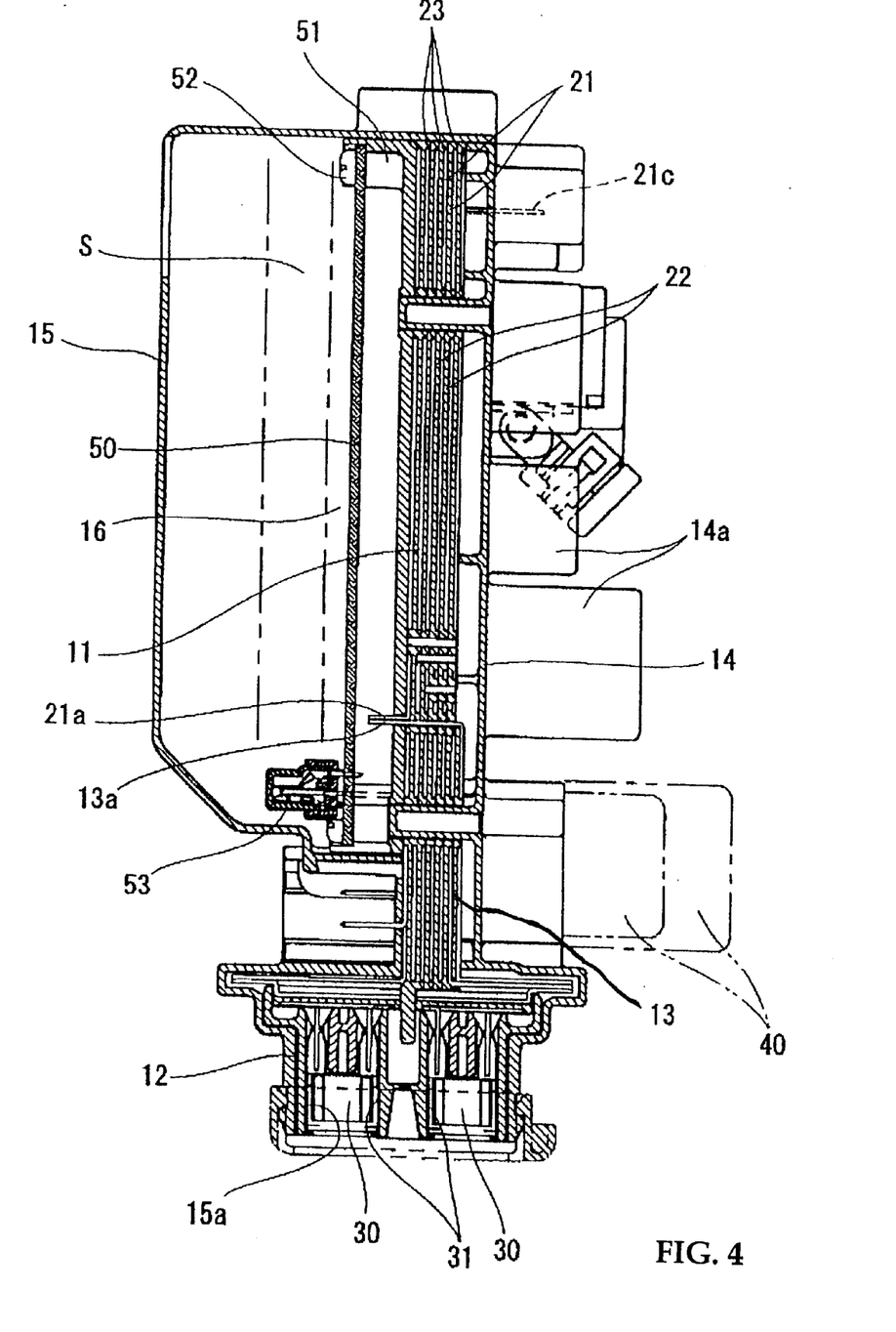
FIG. 4 is a sectional view showing the junction box of FIG. 1 in its assembled state.

As shown in FIG. 4, the connector module 11 is constructed of a plurality of circuit plates 23, layered one upon another to provide a layered assembly, each having an insulation plate 22 and connector connection bus bars 21 fixed to the insulation plate 22 and forming a circuit having a required configuration. The bus bars 21 of each plate 22 are formed, e.g. by stamping, from one conductive plate. Connection tabs 21c at the ends of the bus bars 21 of the circuit plates 23 project into the connector sockets 14a so that terminals of connectors (not shown) connected at the end of a wire harness and fitted in the connector sockets 14a, can connect to the connection tabs 21c of the connector module 11.

Figure 6:
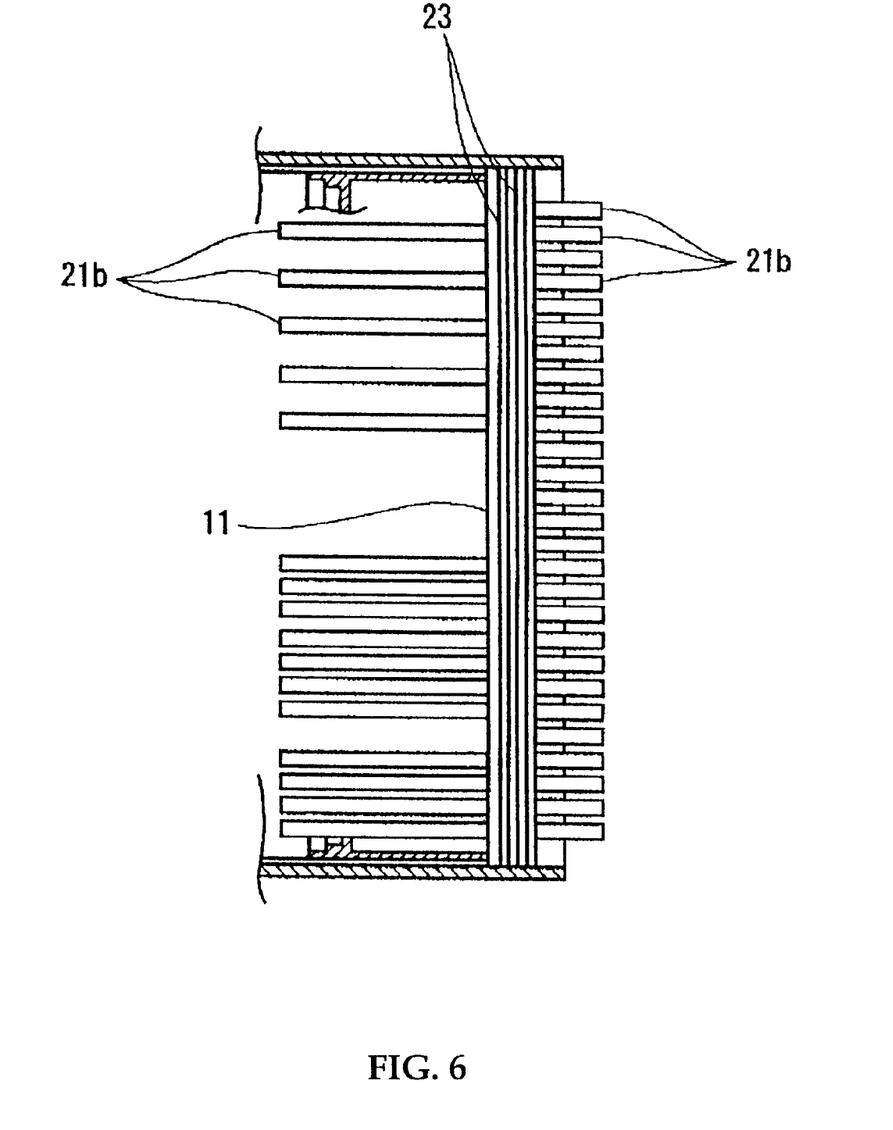
FIG. 6 is a partial sectional view of a portion of the junction box of FIG. 1 showing an end of the connector module.

As shown in FIG. 6, on the lower side of the connector module 11 opposed to the fuse module 12, a plurality of welding tabs 21b formed by bending ends of the bus bars 21 in an L-shape are arranged collectively in a straight row. FIG. 6 shows that these tabs 21b are longer at one side of the connector module (the left side in FIG. 4) than at the other side. A long and narrow opening 11a for receiving intermediate tabs 13a (described later) projecting from the relay module 13 is formed at a position near the center of the connector module 11 in its longitudinal direction. An array of intermediate tabs 21a to be connected to the intermediate tabs 13a of the relay module 13 is formed on the connector module 11 along an edge of the opening 11a by bending the ends of selected bus bars 21.

Figure 5:
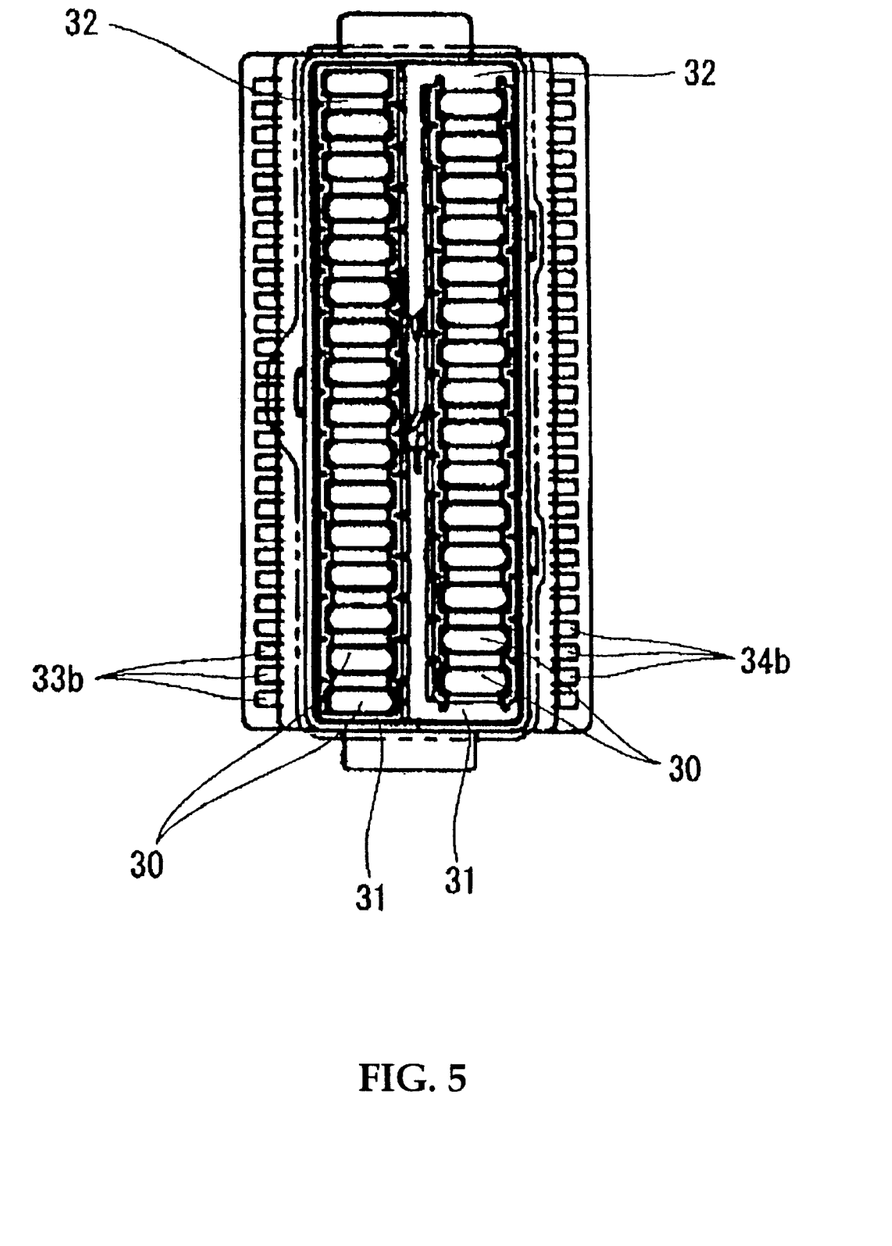
FIG. 5 is a side view showing the outer side of a fuse module of the junction box of FIG. 1.
Figure 7A:
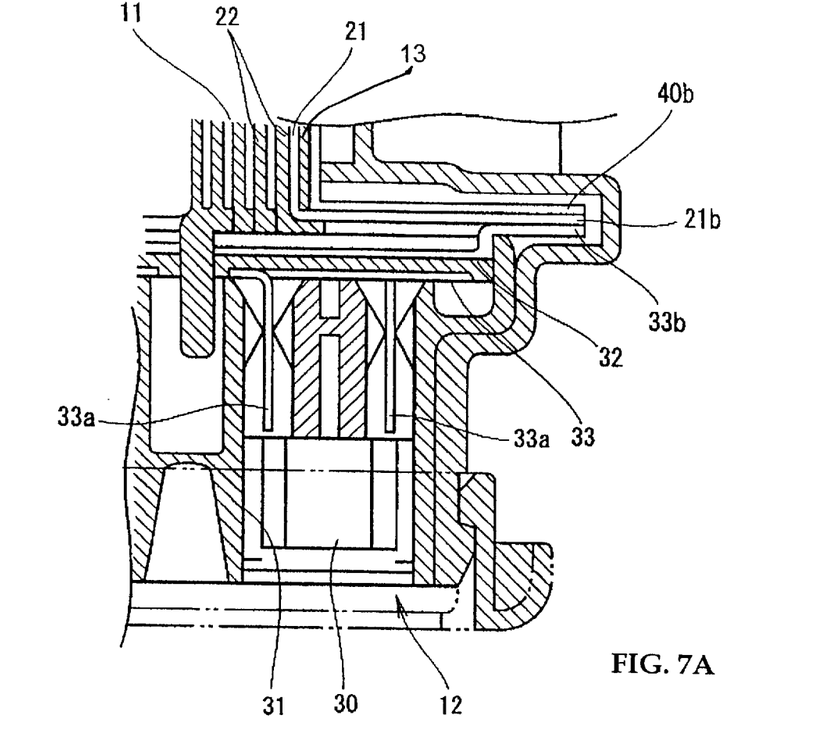
FIG. 7A is a schematic, partly enlarged sectional view of the fuse module of the junction box of FIG. 1.
Figure 7B:
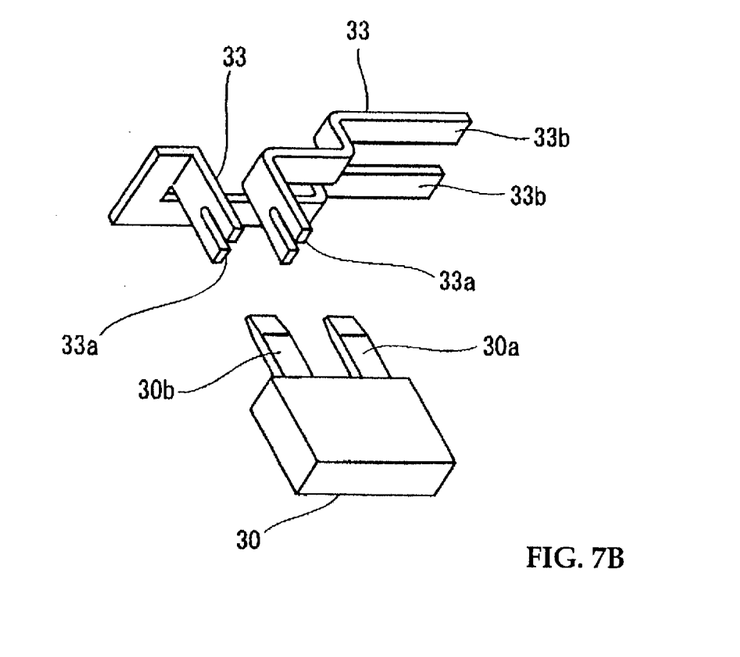
FIG. 7B is a schematic, exploded perspective view showing how a fuse and bus bars are arranged in the fuse module of FIG. 7A.

As shown in FIG. 5, the fuse module 12 disposed horizontally and adjacent to the lower edge of the connector module 11 has a molded plastics body providing a plurality of fuse-receiving sockets 31 arranged in the horizontal rows extending in its longitudinal direction. The fuse module has a flat insulation substrate 32 lying horizontally and, as shown in FIG. 7B, carrying bus bars 33, 34, which provide in each fuse socket 31 a pair of pressure connection terminals 33a, 34a of a power supply side and a load application side, respectively, formed at the ends of the bus bars. The pressure connection terminals 33a and 34a are slotted and project into each fuse socket 31 from above. The ends of the bus bars 33, 34 also project at the left and right sides of the insulation substrate 32 to provide welding tabs 32b, 34b arranged in linear rows confronting the welding tabs 21b of the connector module 12. The substrate 32 is molded with the bus bars 33, 34 in situ.

The fuses 30 are inserted into the fuse sockets 31 of the fuse module 12 to press their pairs of terminals 30a and 30b into the pressure connection terminals 33a and 34a, respectively so that the terminals 30a and 30b are removably connected by pressure connection to the terminals 33a and 34a.

Figure 8A:
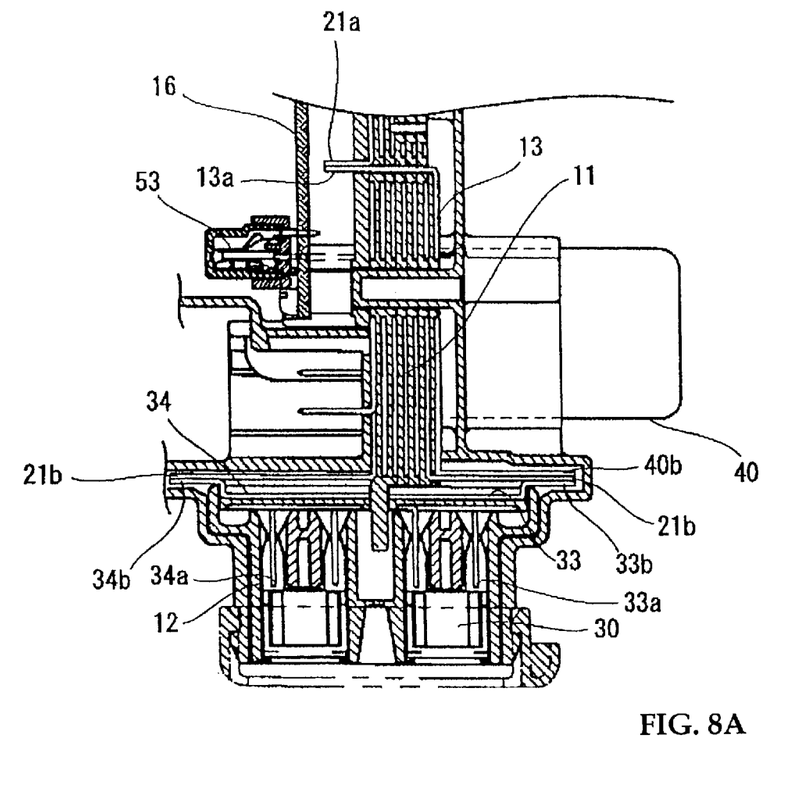
FIG. 8A is partial sectional view of how the relay module is assembled.
Figure 8B:
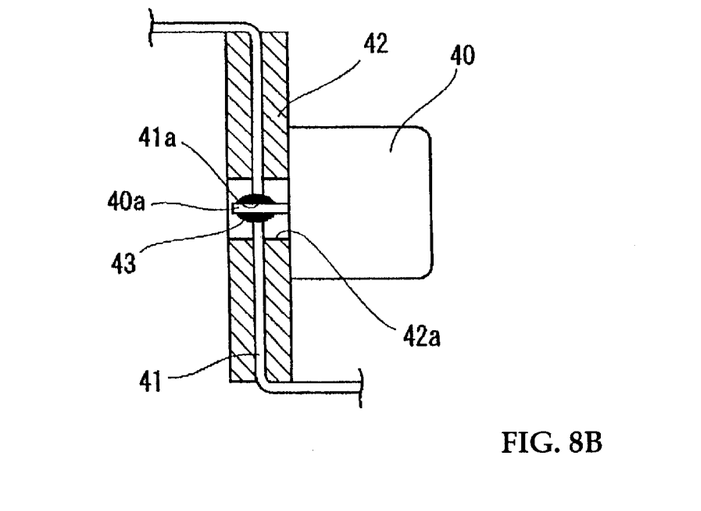
FIG. 8B is a partial sectional view showing how a relay and a bus bar of a relay module are connected to each other in the relay module of FIG. 8A.

As shown in FIGS. 8A and 8B, the relay module 13 is arranged at one side of the connector module 11 and at a position proximate to the lower end where the fuse module 12 is disposed. Bus bars 41 are mounted on a flat substrate 42 of the relay module 13 which also carries the relays 40. The body of the relay 40 is placed on the outer surface of the substrate 42. A terminal 40a of the relay 40 is inserted into openings 41a and 42a formed on the bus bar 41 and the substrate 42, respectively, and welded to the bus bar with solder 43. That is, the terminal 40a of the relay 40 is joined permanently with the bus bar 41.

Ends of bus bars 41 welded to the terminals 40a of the relays 40 are bent to project sideways from the upper end of the substrate 42 to form the intermediate tabs 13a of the relay module 13 confronting the intermediate tabs 21a of the connector module 11. The intermediate tabs 13a, 21a are arranged in confronting linear rows. The other ends of respective bus bars 41 are also bent to lie in a row as welding tabs 40b in confrontation with one row of the welding tabs 21b of the connector module 11 at the lower side edge of the substrate 42.

The electronic control unit 16 (ECU) has electronic parts (not shown) mounted on one surface of its substrate 50. The ECU 16, as shown in FIG. 4, is placed on supports 51 projecting from the side face of the connector module 11, and is fixed between a vertical side face of the first case 15 and the connector module 11 by screws 52. In this state, the electronic parts are disposed in a space S disposed between the substrate 50 and the first case 15.

Printed electrical conductors are arranged at one edge of the substrate 50. To connect the ECU 16 to the connector module 11, bus bar-shaped relay terminals 53 and the electrical conductors of the ECU 16 are connected to each other, either directly or via an ECU connector. The other ends of the relay terminals 53 are connected to bus bars 21 of the connector module 11.

To assemble the junction box 10 composed of the above-described component parts, the relay module 13, the connector module 11, and the ECU 16 are layered one upon another sequentially. Then the electrical conductors of the ECU 16 are connected to the bus bars 21 of the connector module 11 through the relay terminals 53. Thereafter, with the connector module 11 and the relay module 13 layered on each other, the intermediate tabs 13a of the relay module 13 and the confronting intermediate tabs 21a of the connector module 11 are joined with each other by a suitable welding technique, e.g. resistance welding.

The fuse module 12 is placed at its predetermined position, with its welding tabs 32b and 34b confronting the rows of welding tabs 21b of the connector module 11. Then the welding tabs 21b of the connector module 11 and the welding tabs 32b and 34b of the fuse module 12 are sequentially welded to each other. In this welding, at the right side as seen in FIGS. 7A and 8A, the welding tabs 21b of the connector module 11 and the welding tab 32b of the fuse module 12 are also layered on the pressure welding tabs 40b of the relay module 13. More specifically, with a welding tab 21b of the connector module 11 sandwiched between a welding tab 40b of the relay module 13 and a welding tab 32b of the fuse module 12, these three tabs are welded to each other, e.g. by resistance welding. There may also be cases where a welding tab 40b of the relay module 13 and a welding tab 32b of the fuse module 12 are directly welded to each other.

In connecting the connector module 11, the fuse module 12 and the relay module 13 to one another, the welding tabs 21b, 21c of the connector module 11, the welding tabs 32b, 34b of the fuse module 12 and the welding tabs 40b of the relay module 13 are arranged in straight rows at the two sides of the fuse module 12. Thus, the welding operation can be accomplished efficiently.

After these welding operations, the connector module 11, the fuse module 12, the relay module 13 and the electronic control unit 16 joined with each other are fixedly disposed between the vertical cases 14 and 15.

Figure 9B:
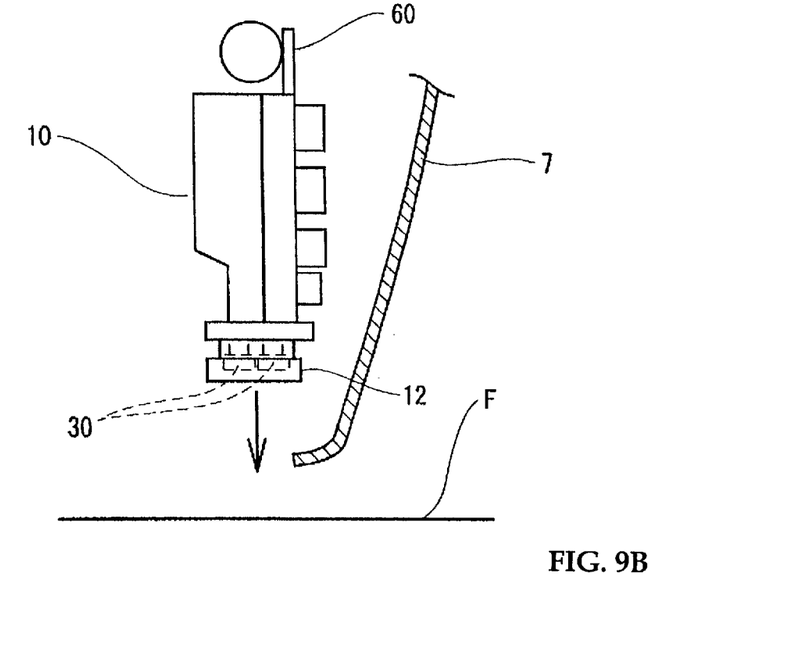
FIG. 9B is a schematic view showing the junction box of the present invention of FIG. 1 installed on a vehicle.

As shown in FIG. 9B, a mounting bracket 60 (not seen in FIG. 1) projecting from the first case 15 of the junction box 10 enables the junction box 10 to be fixed to a body panel of a vehicle. The junction box 10 is disposed behind the rear surface of an instrument panel 7, with the longitudinal direction of the junction box 10, i.e. the plane of the connector module, vertical and with the fuse module 12 disposed horizontally at the lower end of the junction box 10. In this mounting state, the fuses 30 are behind the instrument panel 7 and are replaceable in a space between the lower end of instrument panel 7 and a floor F.

As apparent from the foregoing description, in the junction box of the present invention, it is possible to avoid mounting the fuse module on the surface of the connector module by arranging the fuse module perpendicularly to the plane of the substrates of the connector module at one edge of the connector module. Therefore, it is possible to reduce the length of the surface of the connector module. Accordingly, it is possible to make the junction box compact in its longitudinal direction.

Further, when the specification of any one of the connector module, the fuse module, and the relay module is altered, it may be necessary to alter only one of them. That is, it is unnecessary to alter the entire construction of the junction box. Therefore, it is possible to achieve alteration of the specification at high speed and low cost.

In mounting the junction box on a vehicle, it is possible to dispose the fuse module with the fuses inserted vertically. Thus, an operation of replacing a fuse can be accomplished at a right angle to the floor of the vehicle. Thus, it is unnecessary to provide the instrument panel with a fuse-replacement cover for horizontal insertion and removal of the fuses. Therefore, it is possible to eliminate restrictions on the design of the instrument panel and thereby avoid reduction of strength of the instrument panel.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An electrical junction box, comprising:

a casing having an opening, a connector module that provides a connector connection circuit which in use makes electrical connection to at least one electrical connector, a fuse module that provides a fuse connection circuit which in use makes electrical connection to a plurality of fuses, and a relay module that provides a relay connection circuit which in use makes electrical connection to at least one relay, wherein said connector module is mounted in said casing and comprises a plurality of circuit plates stacked one on another to form a layered assembly having a pair of main faces and a plurality of sides, and said fuse module comprises at least one circuit plate and a plurality of fuse-receiving locations and is mounted at said opening so that said fuse-receiving locations are accessible for insertion and removal of fuses and so that said circuit plate is perpendicular to said main faces of said layered assembly.

2. An electrical junction box according to claim 1, wherein said circuit plate of said fuse module extends alongside and parallel to a first edge of said layered assembly, said fuse-receiving locations are arranged in at least one straight row extending parallel to said first edge of said layered assembly and parallel to said circuit plate of said fuse module, and a direction of insertion and removal of fuses at said fuse-receiving locations is perpendicular to said circuit plate of said fuse module and perpendicular to said first edge of said layered assembly.

3. An electrical junction box according to claim 1, wherein said circuit plate of said fuse module comprises metal bus bars that are bent out perpendicularly from a surface of said fuse module to provide terminals at said fuse-receiving locations to be engaged by the fuses in use.

4. An electrical junction box according to claim 1, wherein said relay module comprises a circuit plate that is mounted in said casing parallel to said main faces of said layered assembly and adjacent to said fuse module.

5. A vehicle having mounted in it an electrical junction box comprising:

a casing having an opening, a connector module that provides a connector connection circuit which in use makes electrical connection to at least one electrical connector, a fuse module that provides a fuse connection circuit which in use makes electrical connection to a plurality of fuses, and a relay module that provides a relay connection circuit which in use makes electrical connection to at least one relay, wherein said connector module is mounted in said casing and comprises a plurality of circuit plates stacked one on another to form a layered assembly having a pair of main faces and a plurality of sides, and said fuse module comprises at least one circuit plate and a plurality of fuse-receiving locations and is mounted at said opening so that said fuse-receiving locations are accessible for insertion and removal of fuses and so that said circuit plate is perpendicular to said main faces of said layered assembly.

6. A vehicle according to claim 5, wherein said relay module comprises a circuit plate that is mounted in said casing parallel to said main faces of said layered assembly and adjacent to said fuse module.

7. A vehicle according to claim 5, wherein said casing has opposite vertical side walls, said main faces of said layered assembly of said connector module are vertical and parallel to said side walls of the casing, said casing has a plurality of connector-receiving sockets at least one said side wall for receiving connectors in use, and said fuse module is mounted at a lower end of said casing so that said circuit plate thereof is horizontal and said fuse-receiving locations are arranged in at least one horizontal row.

8. A vehicle according to claim 5, wherein said main faces of said layered assembly are vertical, and a direction of insertion and removal of fuses at said fuse-receiving locations is vertical.

9. A vehicle according to claim 8, wherein said circuit plate of said fuse module extends alongside and parallel to a first edge of said layered assembly, said fuse-receiving locations are arranged in at least one straight row extending parallel to said first edge of said layered assembly and parallel to said circuit plate of said fuse module, and the direction of insertion and removal of fuses at said fuse-receiving locations is perpendicular to said circuit plate of said fuse module and perpendicular to said first edge of said layered assembly.

10. A vehicle according to claim 7, wherein said electrical junction box comprises an electronic control unit arranged between said connector module and one said vertical side wall of said casing.

11. A vehicle according to claim 8, wherein said electrical junction box has a mounting bracket projecting upwardly from said casing, and said vehicle has, adjacent said electrical junction box, a body member, an instrument panel, and a floor, said mounting bracket being fixed to said body member and said fuse-receiving locations of said fuse module facing towards said floor whereby in use the fuses are inserted and removed in a space between a lower end of said instrument panel and said floor.

* * * * *